US009241001B2

(12) United States Patent
Park et al.

(10) Patent No.: US 9,241,001 B2
(45) Date of Patent: Jan. 19, 2016

(54) METHOD AND APPARATUS FOR PROVIDING SERVICE USING PERSONAL NETWORK

(75) Inventors: Sung-Jin Park, Gyeonggi-do (KR); Yang-Un Lee, Gyeonggi-do (KR); Wuk Kim, Gyeonggi-do (KR); Seok-Hoon Choi, Seoul (KR)

(73) Assignee: Samsung Electronics Co., Ltd. (KR)

( * ) Notice: Subject to any disclaimer, the term of this patent is extended or adjusted under 35 U.S.C. 154(b) by 285 days.

(21) Appl. No.: 12/907,427

(22) Filed: Oct. 19, 2010

(65) Prior Publication Data

US 2011/0093704 A1    Apr. 21, 2011

(30) Foreign Application Priority Data

Oct. 20, 2009  (KR) .................. 10-2009-0099508

(51) Int. Cl.
*H04L 9/32* (2006.01)
*H04L 29/06* (2006.01)
*H04W 12/08* (2009.01)

(52) U.S. Cl.
CPC ............ *H04L 63/102* (2013.01); *H04W 12/08* (2013.01); *H04L 63/0428* (2013.01)

(58) Field of Classification Search
CPC . H04W 12/08; H04L 63/102; H04L 63/0428; H04L 63/10; H04L 63/083; G06F 21/6218
USPC ....................................... 726/2–7, 12, 27–29
See application file for complete search history.

(56) References Cited

U.S. PATENT DOCUMENTS

| 6,912,373 | B2* | 6/2005 | Lee ............................. 455/41.2 |
| 8,249,504 | B2* | 8/2012 | Fujii ........................... 455/41.2 |
| 8,261,078 | B2* | 9/2012 | Barriga et al. ................ 713/171 |
| 8,331,853 | B2* | 12/2012 | Lee et al. ..................... 455/11.1 |
| 2002/0046179 | A1* | 4/2002 | Kokudo ......................... 705/51 |
| 2002/0049675 | A1* | 4/2002 | Kailamaki et al. .............. 705/44 |
| 2005/0025117 | A1* | 2/2005 | Inagaki et al. ................ 370/350 |
| 2005/0113066 | A1* | 5/2005 | Hamberg ...................... 455/411 |
| 2005/0239445 | A1* | 10/2005 | Karaoguz et al. .......... 455/414.1 |
| 2007/0283423 | A1* | 12/2007 | Bradley et al. .................. 726/4 |
| 2008/0263631 | A1* | 10/2008 | Wang et al. ..................... 726/2 |
| 2009/0259838 | A1* | 10/2009 | Lin .............................. 713/150 |

(Continued)

FOREIGN PATENT DOCUMENTS

| KR | 1020030033560 | 5/2003 |
| KR | 1020090106511 | 10/2009 |
| WO | WO 2010050643 | * 5/2010 |

OTHER PUBLICATIONS

Jansen et al., Proximity-based Authentication for Mobile Devies, Jun. 20, 2005.*

(Continued)

*Primary Examiner* — Matthew Smithers
(74) *Attorney, Agent, or Firm* — The Farrell Law Firm, P.C.

(57) ABSTRACT

A method and apparatus in which a device capable of near-field communication receives a service from an external network using a communication function of a device capable of accessing the external network. A personal network is formed with devices having different users, and subscriber information for each user is safely acquired and authenticated, making it possible to provide a service received from the external network to the devices included in the personal network more conveniently.

18 Claims, 7 Drawing Sheets

(56) References Cited

U.S. PATENT DOCUMENTS

2010/0040032 A1* 2/2010 Jeon et al. ............ 370/338
2010/0064025 A1* 3/2010 Nelimarkka et al. ......... 709/217
2010/0138552 A1* 6/2010 Oh et al. ............ 709/229
2011/0310908 A1* 12/2011 Park et al. ............ 370/401
2012/0088480 A1 4/2012 Gravel et al.
2013/0077531 A1* 3/2013 Chu et al. ............ 370/255
2013/0077533 A1* 3/2013 Deprun et al. ............ 370/255
2013/0167210 A1* 6/2013 Chu et al. ............ 726/6

OTHER PUBLICATIONS

International Search Report dated Jun. 7, 2011 issued in counterpart application No. PCT/KR2010/007167.

* cited by examiner

METHOD AND APPARATUS FOR PROVIDING SERVICE USING PERSONAL NETWORK

PRIORITY

This application claims priority under 35 U.S.C. §119(a) to a Korean Patent Application filed in the Korean Intellectual Property Office on Oct. 20, 2009 and assigned Serial No. 10-2009-0099508, the entire disclosure of which is incorporated herein by reference.

BACKGROUND OF THE INVENTION

1. Field of the Invention

The present invention relates generally to a device capable of near-field communication, and more particularly, to a method and apparatus in which a device capable of near-field communication receives a service from an external network using a communication function of a device capable of accessing the external network.

2. Description of the Related Art

With the growing use of Consumer Electronics (CE) devices capable of near-field communication, such as MP3 players, Portable Multimedia Players (PMPs), game consoles and notebook computers, users are seeking convenient ways to download content.

Generally, a user searches for content playable in a CE device and then downloads the content over the Internet using a Personal Computer (PC). Subsequently, to download and play the content, the CE has to connect to the PC via a dedicated cable. At present, near-field communication such as Bluetooth® can be used in place of a dedicated cable and enables sharing of content among devices.

Still, however, there is a limited number of ways for a CE device to directly access the external network. For example, some CE devices may access the Internet using Wireless-Fidelity (WiFi) in the spots where Access Points (APs) are installed, but they cannot access the Internet in the spots with no AP installed. To reduce such inconveniences, there is a need for a method in which devices capable of near-field communication but incapable of directly accessing the external network can access the external network through a gateway, allowing users to utilize desired services, such as content downloading. To meet the needs, Open Mobile Alliance (OMA) in charge of standardization of applications has proposed Converged Personal Network Service (CPNS).

CPNS refers to a service in which one personal network is formed, which is a combination of a device serving as a gateway in charge of communication with an external network and a device for actually playing service and content with access to a service/content provider existing in the external network through the device serving as a gateway, thereby allowing a user to utilize the service or content. In CPNS, a device serving as a gateway is called a Personal Network Gateway (PN gateway), and a device being connected to the PN gateway by near-field communication and accessing the external network via the PN gateway is called a Personal Network Entity (PNE). In addition, a Personal Network server, which serves to provide content and service of the external network to a device in the personal network upon request of the PN gateway, is called a CPNS server. Generally, the PN gateway may include a mobile phone or a PC, and the PNE may include a PMP and an MP3 player.

In CPNS, a PNE sends a request message for a desired service to a PN gateway using near-field communication. The PN gateway relays the service request message to a CPNS server in a provider network. The CPNS server identifies what service the PNE desires to access, and then sends a service request message to a service/content provider in charge of the service. Upon receiving the service request message, the service/content provider provides the service or content to the PNE via the PN gateway.

Generally, since users of a PN gateway and a PNE constituting a personal network are the same, the personal network can be formed without considering charging for use of CPNS service or content. PNEs, i.e., CE devices such as an MP3 player and a PMP, do not have PNE subscriber information, but a PN gateway such as a mobile phone has subscriber information of a CPNS user, so a CPNS server can charge for use of CPNS, using this information. Therefore, after simply checking whether the PNE is its registered device, the PN gateway may create a personal network and provide CPNS.

However, billing-related problems may occur, when one personal network is formed using PNEs and one PN gateway, users of which are different. For example, such problems may occur when one personal network is formed using a game console owned by a user A and a game console and a mobile phone owned by a user B, and the users A and B participate in the same game being provided from the CPNS server via the mobile phone of the user B. In this case, even though both the users A and B are receiving CPNS, only the user B of the mobile phone serving as a PN gateway is charged, for the following reasons. Since a game console, or a PNE, of the user A does not have subscriber information about the user A, the CPNS server cannot identify the user A, thus charging the user B for use of CPNS. Accordingly, the user B of the mobile phone, or a PN gateway, uniquely having subscriber information in the personal network may be charged even for use of CPNS content by the user A.

If devices having different users are prohibited to form one personal network for these reasons, the users may experience considerable inconvenience in accessing resources of the external network via the personal network. In addition, if different personal networks are formed for different users, use of network resources and resources of PN gateways may increase.

SUMMARY OF THE INVENTION

An aspect of the present invention is to address at least the above-mentioned problems and/or disadvantages and to provide at least the advantages described below. Accordingly, an aspect of embodiments of the present invention is to provide a method and apparatus capable of charging respective users even though users of respective devices forming one personal network are different.

Another aspect of embodiments of the present invention is to provide a method and apparatus capable of identifying subscriber information of each user even though users of respective devices forming one personal network are different.

Another aspect of embodiments of the present invention is to provide a method and apparatus in which devices having different users can conveniently receive a service from an external network by forming one personal network.

Another aspect of embodiments of the present invention is to provide a method and apparatus capable of safely delivering subscriber information of a user using a personal network to a CPNS server.

In accordance with one aspect of the present invention, there is provided a method for providing by a PN gateway a service of an external network to an entity constituting a personal network through the personal network. In the method, the PN gateway receives a PN connection request message from an entity connected through near-field communication. If subscriber information is included in the PN connection request message, the PN gateway sends a registration request message including the subscriber information to a server through which the external network provides a service to the entity via the personal network. Upon receiving from the server a response message indicating that entity authentication/authorization based on subscriber information has been completed, the PN gateway includes the entity in the personal network and provides a service received from the server to the entity.

In accordance with another aspect of the present invention, there is provided a method for providing by a PN gateway a service of an external network to an entity constituting a personal network through the personal network. In the method, the PN gateway receives a PN connection request message from an entity. If an address of a subscriber information storage device is included in the PN connection request message, the PN gateway sends a message for requesting subscriber information for the entity to the subscriber information storage device. Upon receiving the subscriber information from the subscriber information storage device, the PN gateway sends a registration request message including the subscriber information to a server through the external network providing a service to the entity via the personal network. Upon receiving from the server a response message indicating that entity authentication/authorization based on subscriber information has been completed, the PN gateway includes the entity in the personal network and provides a service received from the server to the entity.

In accordance with another aspect of the present invention, there is provided a method for providing, by a PN gateway, a service of an external network to an entity constituting a personal network through the personal network. In the method, the PN gateway receives a PN connection request message from an entity. If an address of a subscriber information storage device is included in the PN connection request message, the PN gateway sends a registration request message including the address of the subscriber information storage device to a server through which the external network provides a service to the entity via the personal network. Upon receiving from the server a response message indicating that entity authentication/authorization based on subscriber information acquired from the subscriber information storage device has been completed, the PN gateway includes the entity in the personal network and delivers a service received from the server to the entity.

BRIEF DESCRIPTION OF THE DRAWINGS

The above and other aspects, features and advantages of certain embodiments of the present invention will be more apparent from the following description taken in conjunction with the accompanying drawings, in which.

Throughout the drawings, the same drawing reference numerals will be understood to refer to the same elements, features and structures.

DETAILED DESCRIPTION OF THE EMBODIMENTS OF THE PRESENT INVENTION

Hereinafter, embodiments of the present invention will be described in detail with reference to the accompanying drawings. In the following description, specific details such as detailed configuration and components are merely provided to assist the overall understanding of the embodiments of the present invention. Therefore, it should be apparent to those skilled in the art that various changes and modifications of the embodiments described herein can be made without departing from the scope and spirit of the invention. In addition, descriptions of well-known functions and constructions are omitted for clarity and conciseness.

In the following description, embodiments of the present invention will be provided to achieve the above and other features and advantages of the present invention. Although names of entities defined in CPNS of the Open Mobile Alliance (OMA), a standards organization for applications of mobile terminals, will be used for convenience purposes only, the standard and entity names are not used to limit the scope of the present invention, and various embodiments of the present invention may be applied to any systems having similar technical backgrounds.

Figure 1:
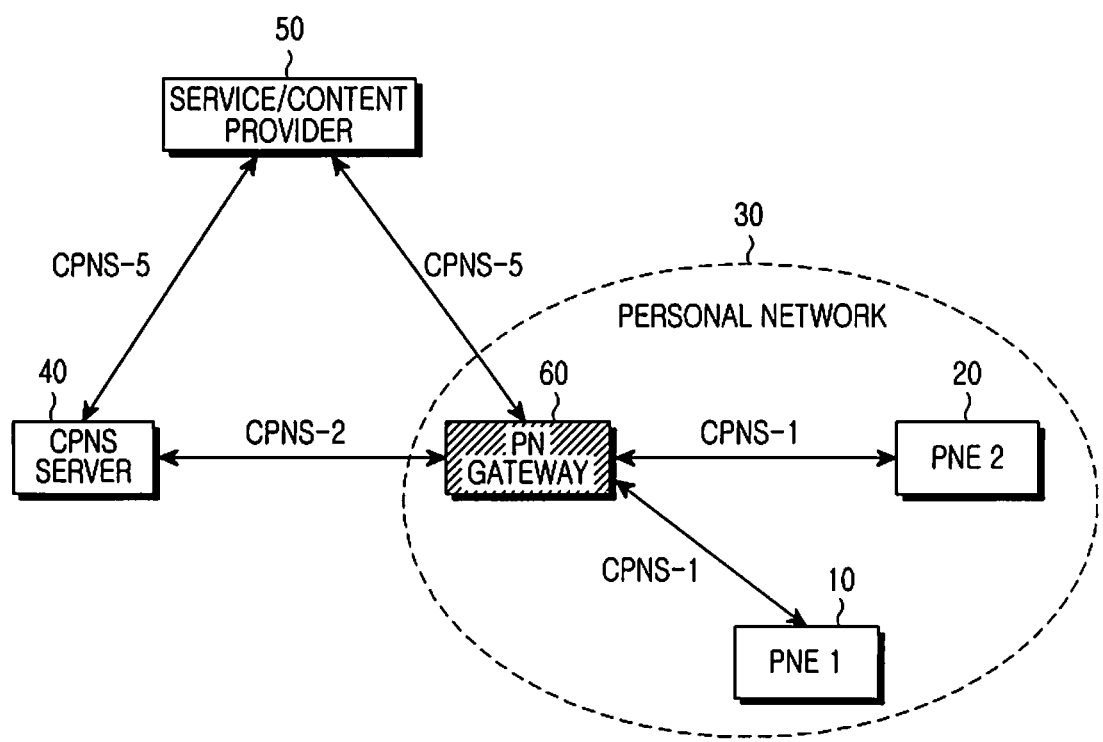
FIG. 1 is a diagram showing an architecture of a CPNS system, to which an embodiment of the present invention is applicable.

An example of a system supporting a CPNS, to which the present invention is applicable, is shown in FIG. 1. CPNS is an example of a service, which can form a personal network among devices capable of near-field communication and deliver a service provided from an external network, through the personal network. FIG. 1 shows architecture of a CPNS system according to an embodiment of the present invention.

The CPNS system according to the present invention includes one or more Personal Network Entities (PNEs), e.g., a PNE #1 10 and a PNE #2 20, a PN gateway 60, a CPNS server 40, and a service/content provider 50 serving as an application server.

The service/content provider 50 is a server that exists in the external network and provides a variety of services and content.

PNEs 10 and 20 are devices that directly provide a service. For example, an MP3 player and a PMP may correspond thereto, and these devices provide the service to the user by playing content stored in the devices. Such PNEs 10 and 20 have common features that the PNEs are capable of near-field communication with other adjacent devices or PNEs, as they have a built-in Near-Field Communication module (NFC module), but the PNEs cannot directly access the service/content provider 50 as they do not have a communication module capable of accessing an external network, or a wide area network. The external network may include, for example, the Internet, a mobile network, etc.

The PNE is also known as a PN device. PNEs 10 and 20 form a personal network 30 by performing pairing with the PN gateway 60 by means of near-field communication. Forming a personal network includes determining whether CPNS is supportable between two devices, checking availability of CPNS through authentication/authorization, checking roles of the devices, and forming a network in the light of an application for providing CPNS.

The personal network 30 may be formed by pairing (or grouping) several PNEs 10 and 20 with one PN gateway 60, and through the personal network 30, PNEs 10 and 20 can make free use of the function of the PN gateway 60 capable of accessing the external network.

The PN gateway 60 has a function capable of accessing the CPNS server 40 existing in the external network, or the provider network. In addition, the PN gateway 60, together with PNEs 10 and 20, can form the personal network 30, and performs a function of relaying CPNS system messages and service/content between the CPNS server 40 and PNEs 10 and 20. That is, if PNEs 10 and 20 in the personal network 30 request a service, the PN gateway 60 plays a role of forwarding the service request to the CPNS server 40 by relaying. If the service/content provider 50 provides the requested service, the PN gateway 60 plays a role of delivering the service to PNEs 10 and 20. In addition, in a peer-to-peer scenario, the PN gateway 60 also plays a role of connecting its personal network to another personal network to enable exchange of content. The PN gateway 60 may include, for example, a mobile phone, a Personal Digital Assistant (PDA), a set-top box, etc.

Upon a registration request from the PN gateway 60, the CPNS server 40 registers and manages the PN gateway 60, PNEs 10 and 20, and the personal network 30, and handles the service/content request that PNEs 10 and 20 send through the PN gateway 60. If the requested service/content is available in the CPNS server 40, the CPNS server 40 provides the requested service/content to PNEs 10 and 20 via the PN gateway 60. However, if the requested service/content is unavailable, the CPNS server 40 forwards the request to the external service/content provider 50 to provide the service/content to PNEs 10 and 20 via the PN gateway 60.

Figure 2:
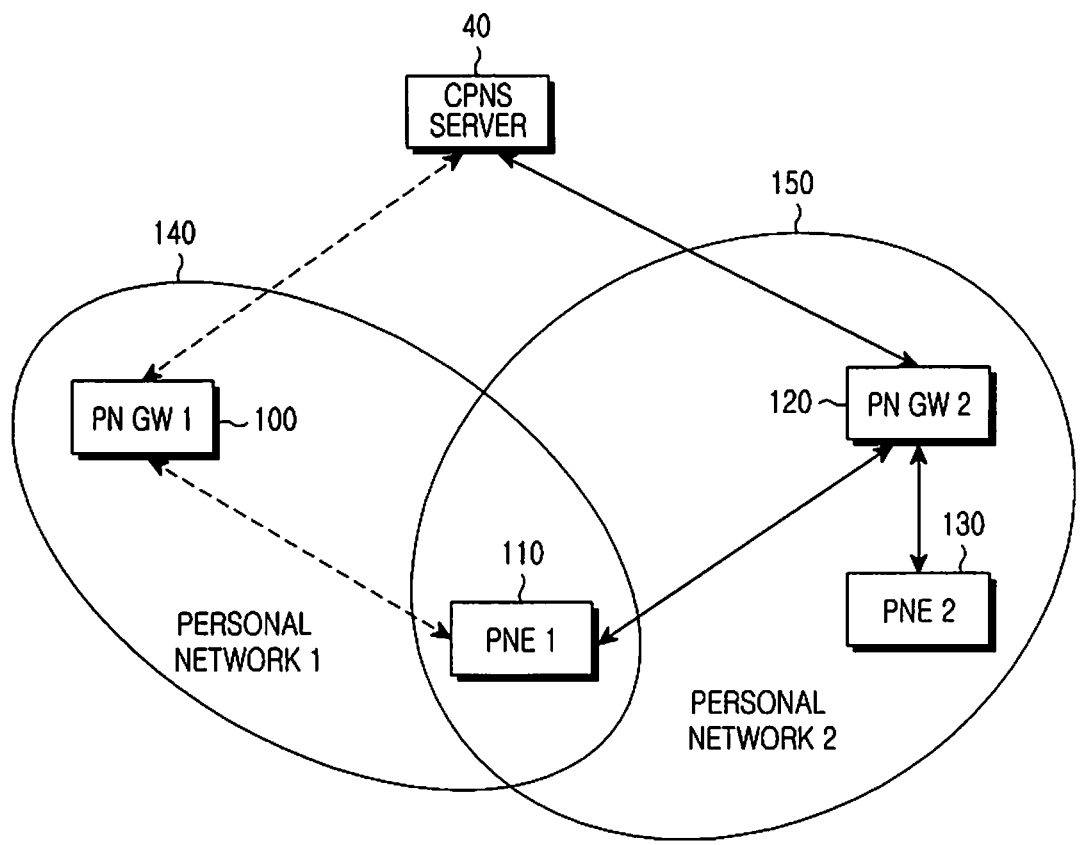
FIG. 2 is a diagram showing an architecture of a CPNS system according to an embodiment of the present invention.

In the example shown in FIG. 1, the PN gateway 60, the PNE 10 and the PNE 20 have the same user, and form the personal network 30 centered on the PN gateway 60. In some cases, however, as shown in FIG. 2, devices owned by different users may form one personal network. For example, different users, i.e., a first user and a second user may want to form the same personal network using their own PNEs according to the type of the service they desire to receive. For instance, the first user and the second user may want to participate in the same game and play the game together.

As above, FIG. 2 shows an example in which devices having different users form one personal network. It is assumed in FIG. 2 that a first PN gateway 100 and a first PNE 110 are owned by the first user, and a second PN gateway 120 and a second PNE 130 are owned by the second user. Therefore, the first PN gateway 100 and the first PNE 110 may receive service/content from the CPNS server 40 by forming a first personal network 140. The second PN gateway 120 and the second PNE 130 may also form a second personal network 150.

If the first user and the second user want to form the same personal network, the first PNE 110 and the second PNE 130 may form one personal network by accessing any one of the first PN gateway 100 or the second PN gateway 120. In the example shown in FIG. 2, the first PNE 110 and the first PN gateway 100 form the first personal network 140 centered on the first PN gateway 100. In order for PNEs having different users to form a personal network using a PN gateway owned by any one of the users in this way and receive a service from the external network, subscriber information of each user should be appropriately delivered to the CPNS server 40.

To this end, the present invention provides a first embodiment in which a PNE acquires subscriber information and delivers it to the CPNS server 40 through a PN gateway of the other user, a second embodiment in which information about a device where subscriber information is stored is delivered to a PN gateway of the other user so that the PN gateway of the other user may acquire the subscriber information and deliver it to the CPNS server 40, and a third embodiment in which information about a device where subscriber information is stored is delivered to the CPNS server 40 so that the CPNS server 40 may acquire the subscriber information.

Figure 3:
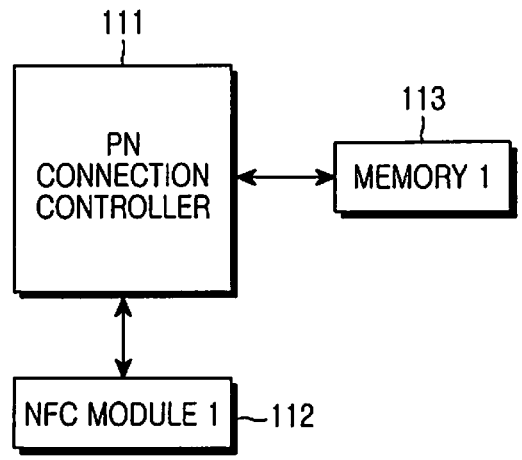
FIG. 3 is a diagram showing a structure of a PNE according to an embodiment of the present invention.
Figure 4:
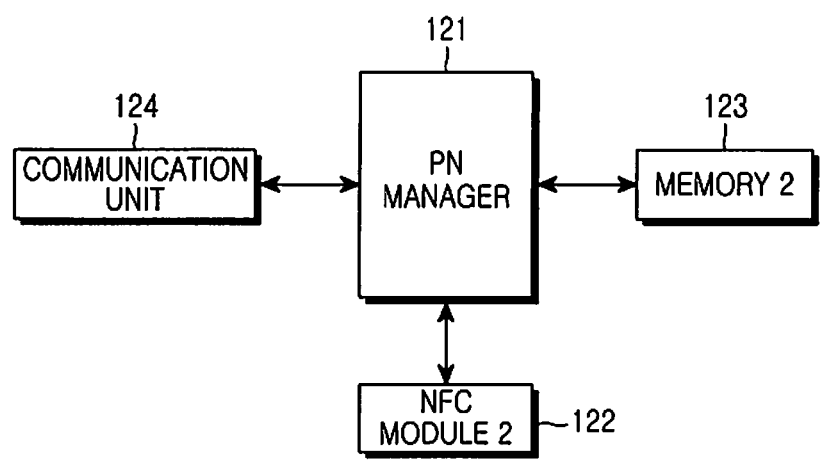
FIG. 4 is a diagram showing a structure of a PN gateway according to an embodiment of the present invention.
Figure 5:
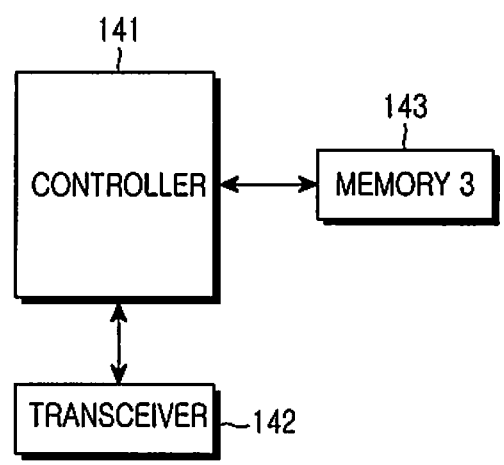
FIG. 5 is a diagram showing a structure of a CPNS server according to an embodiment of the present invention.

FIGS. 3 to 5 illustrate structures of the first PNE 110, the second PN gateway 120, and the CPNS server 40, respectively, according to embodiments of the present invention. While structures and operations of the first PNE 110 and the second PN gateway 120 will be described below by way of example, similar structures and operations are applicable to the second PNE 130 and the first PN gateway 100.

FIG. 3 shows a structure of a first PNE 110 according to an embodiment of the present invention, in which the first PNE 110 is a device having no subscriber information. Referring to FIG. 3, the first PNE 110 includes a PN connection controller 111, an NFC module 112, and a first memory 113.

The first NFC module 112, a module for performing near-field communication, may be a module that performs, for example, Bluetooth® communication, Zigbee communication, Infrared Data Association (IrDA) communication, or visible light communication.

The first memory 113, which can be used as a working memory of the PN connection controller 111, stores various program data necessary for forming a personal network, and stores device information about the first PNE 110. The device information refers to information about various features and capabilities the first PNE 110 can provide, and may be provided by the PNE manufacturer. If the first PNE 110 is a PMP, an example of its device information is as shown in Table 1.

TABLE 1

| PNE 1 dev. Info | |
|---|---|
| Parameters | Values |
| Network Interface | WLAN |
| Maximum Bandwidth | 1 Mbps |
| Storage Capacity | 2048 MB |
| I/O Interface | Display, Microphone, Speaker |
| Video Codec | H.264 |
| Audio Codec | AC3 |
| Display Size | 6 × 4 inch |
| Resolution | 1224 × 768 |
| Battery Capacity | 30 W |
| ... | ... |

In addition, the first memory 113 stores a PNE identifier assigned by the first PN gateway 100 during the formation of a personal network. Furthermore, the first memory 113 stores the data which has been received from the first PN gateway 100 in reply to a service/content request.

The PN connection controller 111 controls all operations of the first PNE 110, which are related to forming and releasing a personal network, and controls operations related to requesting and receiving the service/content through the formed personal network. To form a personal network, the PN connection controller 111 performs physical pairing with adjacent devices and forms a communication link by controlling the first NFC module 112. The PN connection controller 111 makes a search to find a PN gateway among the physically-paired devices, and requests PN connection if a PN gateway is detected. The PN connection request may be transmitted along with the device information of the first PNE 110.

Upon receiving a notification, from the PN gateway, indicating a connection to the personal network along with a PNE identifier, the PN connection controller 111 stores the received information in the first memory 113. Upon user request, the PN connection controller 111 requests and receives service/content, for example, music files or video files, through the connected PN gateway and the CPNS server 40, and stores the received information in the first memory 113.

In accordance with a first embodiment of the present invention, the PN connection controller 111 may send the first PN gateway 100 a request for subscriber information of a first user and a request for an identifier of the first PN gateway 100, and receive the requested information from the first PN gateway 100. These two different types of information may be transmitted to a PN gateway of the other user.

FIG. 4 shows a structure of a second PN gateway 120 according to an embodiment of the present invention, in which the second PN gateway 120 is a device having subscriber information. For example, the second PN gateway 120 is a device such as a mobile phone, with which a user subscribes to a service of a mobile network operator and uses related functions only for services previously agreed upon with the operator. Referring to FIG. 4, the second PN gateway 120 includes a PN manager 121, a second NFC module 122, a second memory 123, and a communication unit 124.

The second NFC module 122, a module for performing near-field communication, may be a module that performs, for example, Bluetooth® communication, Zigbee communication, IrDA communication, or visible light communication.

The communication unit 124 performs communication with entities in the external network, and exchanges messages and data with the CPNS server 40 and the service/content provider 50 of FIG. 1.

The second memory 123, which can be used as a working memory of the PN manager 121, stores various program data necessary for forming a personal network. The second memory 123 stores a PNE list for PNEs connected to the personal network, and device information of the PNEs. The PNE list and the device information may be managed separately for each associated personal network.

In addition, the second memory 123 stores subscriber information of the second PN gateway 120, i.e., subscriber information of a second user, and stores a registered-PNE list (or a list of registered PNEs). The registered-PNE list is information about the PNE, subscriber information of which is permitted to be provided, or which belongs to the same user as that of the second PN gateway 120. In accordance with an embodiment of the present invention, the PNE list may be used as the registered-PNE list, or may be created as a separate list. The second memory 123 also stores information about a security key used for encryption of subscriber information.

The PN manager 121 controls the overall operation of the second PN gateway 120 associated with the personal gateway. In other words, to form a personal network, the PN manager 121 performs physical pairing with adjacent devices and forms a communication link by controlling the second NFC module 122. Upon receiving a mode search message from a physically-paired device, the PN manager 121 sends the device a response message indicating a PN gateway. Upon receiving a PN connection request from the physically-paired device, the PN manager 121 performs authentication/authorization on the device, assigns a PNE identifier to the device, and creates a new PNE list or updates the existing PNE list. The PN manager 121 stores device information it has received along with the PN connection request, in the second memory 123 in association with the relevant PNE. If there is any PNE excluded from the personal network, the PN manager 121 updates the PNE list and device information.

When forming a new personal network, the PN manager 121 creates a PN inventory and registers it in the CPNS server 40. The PN inventory may include only the PNE list according to an embodiment of the present invention, or may include both the PNE list and its associated device information according to another embodiment of the present invention. After registration of the PN inventory, the PN inventory may be updated every time the PNE list is updated.

The PN manager 121 forwards the service request received from a PNE to the CPNS server 40, and delivers the data received from the CPNS server 40 or the service/content provider 50, to the PNE.

In accordance with the first embodiment of the present invention, upon receiving a subscriber information request message from an arbitrary PNE, the PN manager 121 determines whether the PNE is a PNE registered to the second user by checking the registered-PNE list. If the PNE is a PNE registered to the second user, the PN manager 121 encrypts a subscriber address and delivers it to the PNE. Encrypted key information may be delivered to the PNE along with the encrypted subscriber address. If the PNE is not a PNE registered to the second user, the PN manager 121 may send a rejection response to the PNE. In accordance with the first embodiment of the present invention, upon receiving a PN connection request message from a PNE, the PN manager 121 determines whether subscriber information is included in the received PN connection request message. If subscriber information is included, the PN manager 121 transmits the subscriber information included in the PN connection request message and identification information of the PNE to the CPNS server 40 along with a PN inventory registration message. If subscriber information is not included in the PN connection request message, the PN manager 121 determines whether the PNE is a PNE registered to the second user by checking the registered-PNE list. If the PNE is not a PNE registered to the second user, the PN manager 121 delivers a rejection response to the PNE. If the PNE is a PNE registered to the second user, the PN manager 121 performs a normal connection process.

In accordance with a second embodiment of the present invention, upon receiving a PN connection request message from an arbitrary PNE including an address of a device storing subscriber information (or a subscriber information storage device), the PN manager 121 sends a request for subscriber information to the device storing subscriber information. The device storing subscriber information is highly likely to be a device capable of serving as a PN gateway, and a subscriber information request message includes identification information of the PNE. The PNE identification information included in the subscriber information request message is referenced to determine whether subscriber information is provided. Upon acquiring subscriber information, the PN manager 121 transmits the acquired subscriber information to the CPNS server 40 along with the identification information of the PNE, using a PN inventory registration message. Upon receiving a subscriber information request message from a PN gateway of another user, the PN manager 121 determines whether subscriber information is provided by checking PNE identification information included in the subscriber information request message. The subscriber information is provided after being encrypted, and may be delivered along with encrypted key information.

In accordance with a third embodiment of the present invention, upon receiving a PN connection request message from an arbitrary PNE including an address of a device storing subscriber information, the PN manager 121 may transmit the address of the device storing subscriber information, to the CPNS server 40 along with identification information of the PNE, using a PN inventory registration message. Upon receiving a subscriber information request message from the CPNS server 40, the PN manager 121 determines whether subscriber information is provided by checking PNE identification information included in the subscriber information request message, and delivers the subscriber information based on the determination.

FIG. 5 shows a structure of a CPNS server 40 according to an embodiment of the present invention. Referring to FIG. 5, the CPNS server 40 includes a controller 141, a transceiver 142, and a third memory 143.

The transceiver 142 performs communication with a PN gateway and a service/content provider.

The third memory 143 registers and stores a PN inventory provided from the PN gateway. In addition, the third memory 143 stores various content or services to be provided to a PNE(s), and stores a service matching table for each content or service. The service matching table includes information about the minimum device features and capabilities required for a PNE that will receive and process the content/service. An example of the service matching table for video content is as shown in Table 2.

TABLE 2

Service Matching Table

| Parameters | Values |
|---|---|
| Title | Titanic |
| Service Type | Video |
| Video Codec | H.264 |
| Audio Codec | AC3 |
| Resolution | QVGA |
| Data Rate | 384 Kbps |
| Language | English |
| Subtitle | Korean, English |
| Playing Time | 1800 s |
| . . . | . . . |

The third memory 143 may receive device information for a PNE list corresponding to each personal network, included in a PN inventory, from the PN gateway and store the received device information according to an embodiment of the present invention, or may store only the PNE list according to another embodiment of the present invention.

The controller 141 controls the overall operation of the CPNS server 40. Upon a PN inventory registration request from the PN gateway, the controller 141 performs CPNS authentication/authorization for each PNE included in the PN inventory and stores the PN inventory in the third memory 143. If no PN identifier is assigned to a personal network included in the PN inventory, the controller 141 assigns a PN identifier, or if a PN identifier has already been assigned, the controller 141 determines whether the PN identifier is duplicative.

Upon a service/content request of a PNE provided from the PN gateway, the controller 141 determines whether the service/content requested by the PNE is service/content available for the PNE, adjusts the service/content to an available format, and delivers the adjusted service/content to the PNE through the PN gateway. Using subscriber information from the communication operator, the controller 141 in the CPNS server 40 may perform authentication and billing for provision of CPNS service/content.

In accordance with the first and second embodiments of the present invention, if subscriber information is encrypted in the PN inventory registration message, the controller 141 decrypts the encrypted subscriber information. During the decryption, the controller 141 may use security key information included in the PN inventory registration message.

In accordance with the third embodiment of the present invention, upon receiving a PN inventory registration message including an address of a device storing subscriber information and identification information of an arbitrary PNE, the controller 141 sends an authentication request for the PNE to the device, storing subscriber information, and acquires subscriber information according to the authentication results.

Figure 6:
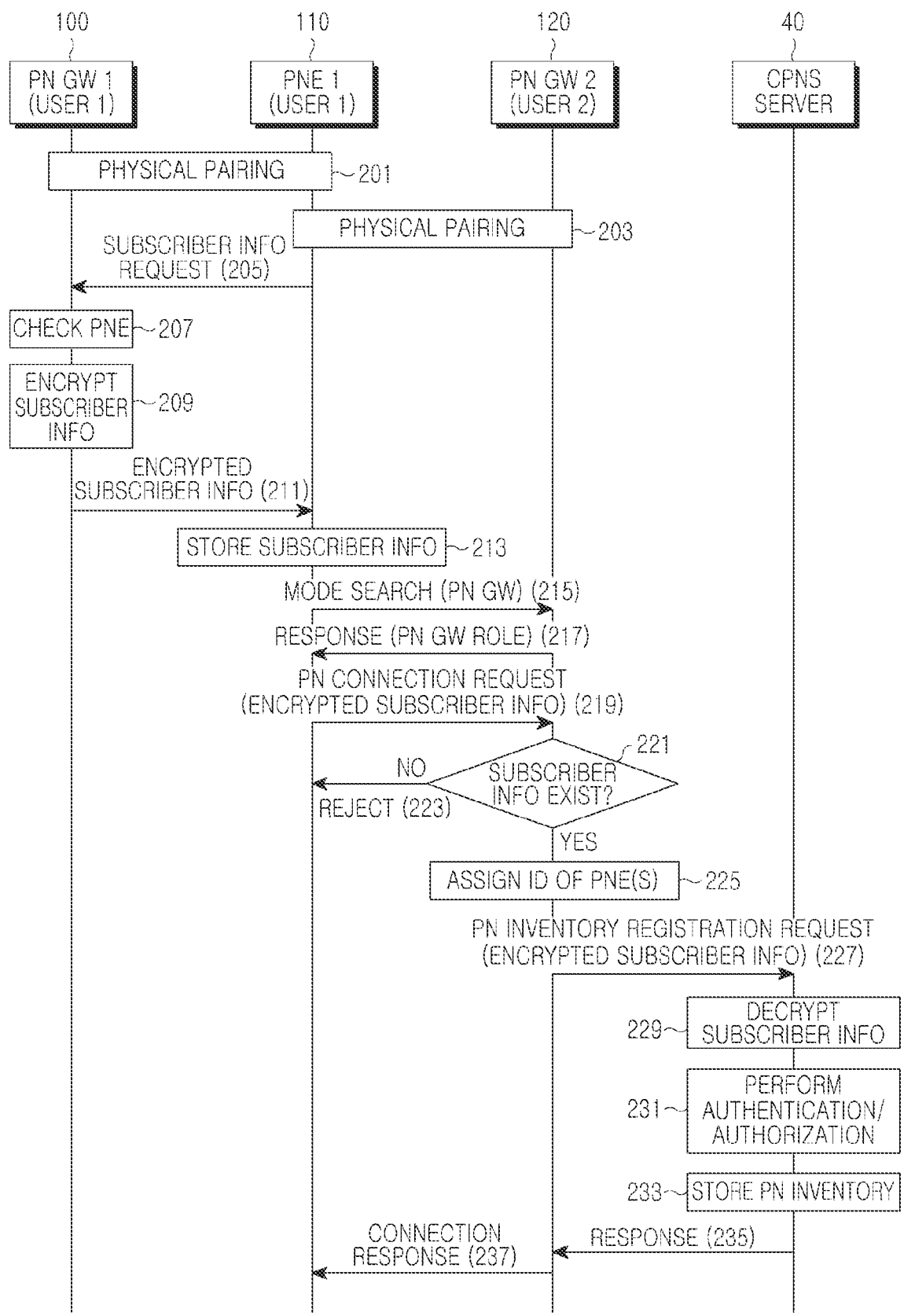
FIGS. 6 to 8 are diagrams showing a process of providing CPNS according to different embodiments of the present invention.
Figure 7:
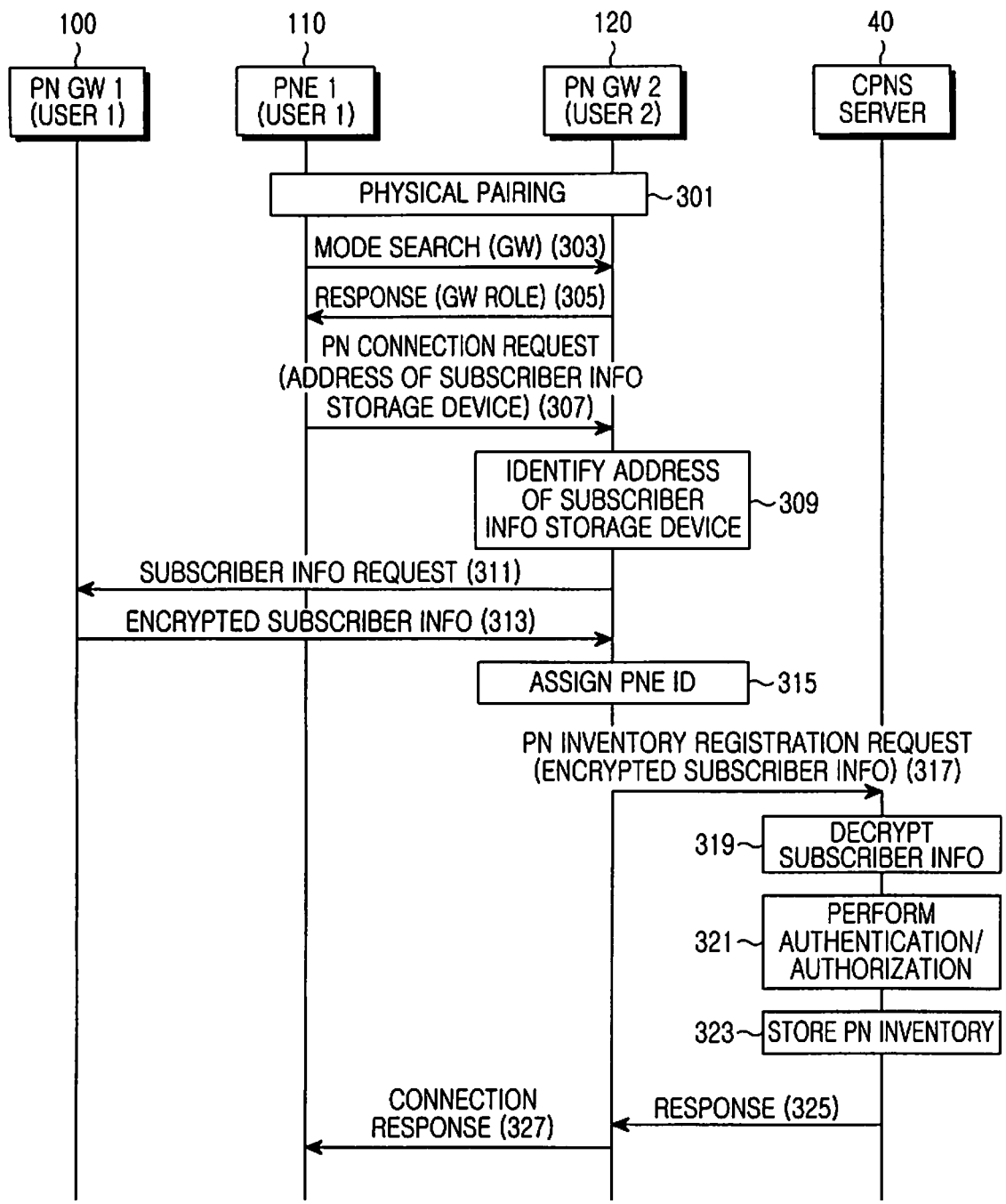
Figure 8:
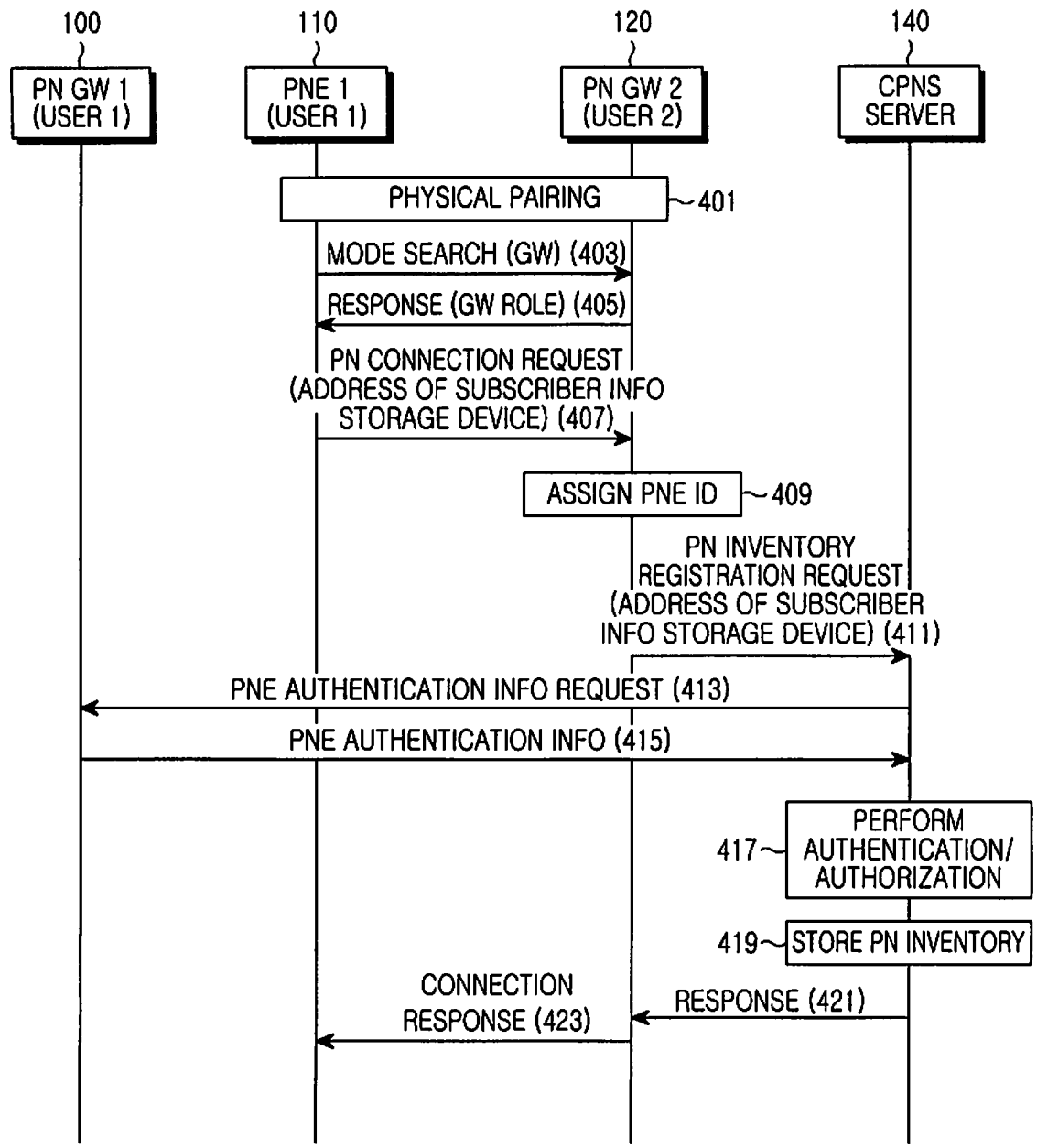

Reference will now be made to FIGS. 6 to 8 to describe a process of acquiring subscriber information and providing a service according to different embodiments of the present invention, in the CPNS system. FIGS. 6 to 8 show a process of acquiring subscriber information of a first user, forming a personal network and providing a CPNS service in the case where a first PNE 110, or a device of the first user, accesses a second PN gateway 120, or a device of a second user, and forms a personal network, according to embodiments of the present invention.

First, the first embodiment of the present invention will be further described with reference to FIG. 6. In the first embodiment of the present invention, as described above, a PNE acquires subscriber information of the same user as its user and delivers the subscriber information to the CPNS server 40 through a PN gateway of the other user.

As shown in FIG. 6, in steps 201 and 203, the first PNE 110 of the first user performs a connection operation for data communication, i.e., physical pairing, with the first PN gateway 100 of the first user and the second PN gateway 120 of the second user, using near-field communication technology.

In step 205, to deliver subscriber information of the first user to the second PN gateway 120, the first PNE 110 sends a request message for subscriber information to the first PN gateway 100.

In step 207, upon the request, the first PN gateway 100 determines whether the first PNE 110 is a device authorized to receive subscriber information, by checking the registered-PNE list. In other words, the first PN gateway 100 determines whether the first PNE 110 is a device of the first user. If the first PNE 110 is a device included in the registered-PNE list, the first PN gateway 100 encrypts subscriber information in step 209, and transmits the encrypted subscriber information to the first PNE 110 along with a response message in step 211. The reason for encrypting the subscriber information is to prevent a PN gateway of the other user, which has received the subscriber information, from making fraudulent use of the subscriber information to receive a service. Accordingly, the first PN gateway 100 performs encryption using its unique security key that the PN gateway of the other user cannot be aware of. Since describing how to generate and use a security key may unnecessarily obscure the gist of the present invention, the description will be omitted for clarity.

After receiving the subscriber information in step 211, the first PNE 110 stores the subscriber information in step 213, and performs a search process to find the second PN gateway 120 in step 215. For the search, the second PN gateway 120 sends a search message through the second NFC module 122 of FIG. 4. Since the second PN gateway 120 cannot determine in which CPNS operation mode a physically-paired device operates, the second PN gateway 120 finds out the operation mode by sending a search message. Thus, the search message may include a parameter 'PN GW' indicating a search for a PN gateway. The parameter 'PN GW' is a parameter, which is set such that only the CPNS devices serving as a PN gateway respond to the search message.

In step 217, the second PN gateway 120 sends the first PNE 110 a response message containing PN GW role information indicating a mode in which the second PN gateway 120 is operating after receiving the search message.

In step 219, upon receiving the response message from the second PN gateway 120, the first PNE 110 sends a PN connection request message to the second PN gateway 120. The PN connection request message includes device information of the first PNE 110 and the encrypted subscriber information.

After receiving the PN connection request message in step 219, the second PN gateway 120 determines whether a PNE that sent the PN connection request message exists in its registered-PNE list, to check whether the PNE is a PNE registered to the second user. If the PNE is not a PNE registered to the second user, the second PN gateway 120 determines in step 221 whether subscriber information is included in the PN connection request message. If subscriber information is included, the second PN gateway 120 proceeds to step 225, and if subscriber information is not included, the second PN gateway 120 sends a rejection response to the first PNE 110 in step 223.

If the subscriber information is included, the second PN gateway 120 assigns a PNE identifier to the first PNE 110 in step 225, and sends a PN inventory registration message to the CPNS server 40 in step 227. The PN inventory may be a list of personal networks, or a list of devices included in one personal network. Table 3 below shows an example of a PN inventory.

TABLE 3

Personal Network Information
Personal Network #1 - Identity
PN GW Info.
PNE #1
Device Information

| Parameters | Values |
|---|---|
| Device Name | Portable Media Player (PMP) |
| Network Interface | Bluetooth ® |
| Bandwidth (variable) | 1 Mbps |
| Storage Capacity | 2048 MB |
| I/O Interface | Display, Microphone, Speaker |
| Video Codec | H.264 |
| Audio Codec | ACS |
| Display Size | 6 × 4 inch |
| Resolution | 1024 × 768 |
| Battery (variable) | 30 W |
| . . . | . . . |
| Content Info. | |
| Music | Michael Jackson #8 |
| Movie | Terminator #4 |
| . . . | . . . |
| PNE #2 | |
| PNE #3 | |
| Personal Network #2 - Identity | |
| PN GW Info. | |
| Device #1 | |
| . . . | |

Although it is assumed in the first embodiment of the present invention that only the first PNE 110 and the second PN gateway 120 are included in the personal network, the personal network may have one or a plurality of PNEs of the second user.

The PN inventory includes device information of the first PNE 110 and encrypted subscriber information.

If encrypted subscriber information is included in the PN inventory registration message received in step 227, the CPNS server 40 decrypts the subscriber information in step 229, and performs authentication/authorization based on the device information and subscriber information included in the PN inventory in step 231, to authenticate whether the subscriber is a CPNS user. If authentication/authorization is successfully completed, the CPNS server 40 stores the PN inventory information in step 233, and charges even the first user for the service provision from that point on. In step 235, the CPNS server 40 sends the second PN gateway 120 a response message indicating the registration of the PN inventory. In step 237, the second PN gateway 120 generates a response message indicating completion of the PN connection operation, and sends the response message to the first PNE 110. Henceforth, the second PN gateway 120 forwards a CPNS content request from the first PNE 110 to the CPNS server 40, and delivers the content, which is received in response to the request, to the first PNE 110.

Next, an operation process according to the second embodiment of the present invention will be described with reference to FIG. 7. In the second embodiment of the present invention, information of a device, in which subscriber information is stored, is delivered to a PN gateway of the other user, allowing the PN gateway of the other user to acquire the subscriber information and deliver the acquired subscriber information to the CPNS server 40.

It is assumed in FIG. 7 that the first PNE 110 has information about an address of the first PN gateway 100 in which subscriber information of the first user is stored. The address of the first PN gateway 100 may be acquired from, for example, a previous record of forming the personal network.

In step 301, the first PNE 110 performs a connection operation for data communication, i.e., physical pairing, with the second PN gateway 120 using near-field communication. In step 303, the first PNE 110 sends a search message to determine in which operation mode adjacent devices operate, and the search message includes a parameter 'PN GW'.

In step 305, upon receiving the search message, the second PN gateway 120 sends the first PNE 110 a response message including PN GW role information, indicating its operation mode.

After receiving the response message from the second PN gateway 120 in step 305, the first PNE 110 sends a PN connection request message to the second PN gateway 120 in step 307. The PN connection request message includes device information of the first PNE 110 and an address of a device having subscriber information of the user of the first PNE 110, i.e., an address of the first PN gateway 100.

After receiving the PN connection request message in step 307, the second PN gateway 120 identifies in step 309 that an address of the device storing subscriber information is included in the PN connection request message. After identifying the address of the device storing subscriber information, i.e., the address of the first PN gateway 100, the second PN gateway 120 sends a request for subscriber information of the first PNE 110 to the first PN gateway 100 in step 311.

In step 313, upon receiving the subscriber information request, the first PN gateway 100 determines whether the first PNE 110 is a PNE registered to the first user, and if so, the first PN gateway 100 encrypts subscriber information of the first user and transmits the encrypted subscriber information to the second PN gateway 120.

After receiving the subscriber information in step 313, the second PN gateway 120 assigns an identifier to the first PNE 110 in step 315. The identifier includes an address, and is used to identify a PNE when CPNS service/content is actually utilized by the user. In step 317, the second PN gateway 120 sends a PN inventory registration message to the CPNS server 40. The PN inventory includes device information of the first PNE 110 and encrypted subscriber information, and may also include other information such as PN gateway information and a PN identifier.

If encrypted subscriber information is included in the PN inventory registration message received in step 317, the CPNS server 40 decrypts the subscriber information in step 319. In step 321, the CPNS server 40 performs authentication/authorization based on the device information and subscriber information included in the PN inventory to authenticate whether the subscriber is a CPNS user. If the authentication/authorization is successfully completed, the CPNS server 40 stores the PN inventory information in step 323, and henceforth charges even the first user for the service provision. In step 325, the CPNS server 40 sends the second PN gateway 120 a response message indicating the registration of the PN inventory. In step 327, the second PN gateway 120 creates a response message indicating completion of the PN connection operation, and sends the response message to the first PNE 110. From now on, the second PN gateway 120 forwards a CPNS content request from the first PNE 110 to the CPNS server 40, and delivers the content, which is received in response to the request, to the first PNE 110.

Next, an operation process according to the third embodiment of the present invention will be described with reference to FIG. 8. In the third embodiment of the present invention, information about a device, in which subscriber information is stored, is delivered to the CPNS server 40, allowing the CPNS server 40 to acquire the subscriber information.

It is assumed in FIG. 8 that the first PNE 110 has information about an address of the first PN gateway 100 having subscriber information of the first user. Steps 401 to 407 correspond to steps 301 to 307 in FIG. 7.

In step 409, after receiving a PN connection request message including an address of the first PN gateway 100 as an address of a device, storing subscriber information, in step 407, the second PN gateway 120 assigns an identifier to the first PNE 110 in step 409. In step 411, the second PN gateway 120 sends a PN inventory registration message to the CPNS server 40. The PN inventory may be a list of personal networks, or a list of devices belonging to one personal network. The PN inventory includes an address of a device, storing subscriber information, i.e., an address of the first PN gateway 100, and an identifier of the first PNE 110. Although it is assumed in the third embodiment of the present invention that only the first PNE 110 and the second PN gateway 120 are used to form the personal network, the personal network may be formed to have one or a plurality of PNEs of the second user.

After receiving the PN inventory registration message in step 411, the CPNS server 40 identifies that an address of the device, storing subscriber information, is included in the PN inventory registration message. After identifying that the address of the device, storing subscriber information, is an address of the first PN gateway 100, the CPNS server 40 sends a request for authentication/authorization information about the first PNE 110 to the first PN gateway 100 in step 413.

The first PN gateway 100 determines whether the first PNE 110 is a device or PNE registered to the first user, and if so, the first PN gateway 100 transmits subscriber information to the CPNS server 40 in step 415.

In step 417, the CPNS server 40 performs authentication/authorization based on the device information in the PN inventory and the subscriber information sent by the first PN gateway 100, to authenticate whether users of the first PN gateway 100 and the first PNE 110 in the PN inventory are CPNS users. If the authentication/authorization is successfully completed, the CPNS server 40 stores the PN inventory information in step 419, and henceforth charges even the first user for the service provision. In step 421, the CPNS server 40 sends the second PN gateway 120 a response message indicating the registration of the PN inventory. In step 423, the second PN gateway 120 generates a response message indicating completion of the PN connection operation and sends the response message to the first PNE 110. From now on, the second PN gateway 120 forwards a CPNS content request from the first PNE 110 to the CPNS server 40, and delivers the content, which is received in response to the request, to the first PNE 110.

As is apparent from the foregoing description, the present invention provides a method and apparatus for safely delivering subscriber information of a user using a PNE to a PN gateway of the other user or a CPNS server, thereby allowing different users to form a personal network using different devices.

If a personal network is created by connecting PNEs of plural users centering on one PN gateway, and a CPNS service, e.g., a game service, is provided through the personal network, then fair billing is possible. In addition, the PN gateway receives the data used in common for a game service, i.e., background music and images, and transmits the received data to multiple PNEs, thereby contributing to saving network resources and PN gateway resources.

According to embodiments of the present invention, even though users of respective devices forming one personal network are different, subscriber information of each user can be safely delivered to a personal network server, making it possible to identify subscriber information of each user and thus ensure fair billing on each user. In addition, since the present invention enables devices having different users to form one personal network and conveniently receive services from the external network through the personal network, it is not necessary to form a personal network for each user on an individual basis, thus contributing to saving network resources and PN gateway resources.

For example, although it is assumed in the first embodiment that the first PNE 110 acquires subscriber information from the first PN gateway 100, the first PNE 110 may acquire the subscriber information from a subscriber information storage device rather than the PN gateway.

While the invention has been shown and described with reference to certain embodiments thereof, it will be understood by those skilled in the art that various changes in form and details may be made therein without departing from the spirit and scope of the invention as defined by the appended claims and their equivalents.

What is claimed is:

1. A method for providing by a Personal Network (PN) gateway a service of an external network to an entity constituting a personal network through the personal network, the method comprising:

receiving a PN connection request message from an entity connected through near-field communication;

determining whether the PN connection request message includes subscriber information, wherein the subscriber information is generated by another PN gateway connected with the entity;

if the subscriber information is included in the PN connection request message, sending a registration request message including the subscriber information to a server, the server on the external network provides a service to the entity via the personal network;

if subscriber information is not included in the PN connection request message, sending a PN connection rejection message to the entity;
receiving from the server a response message indicating that entity authentication/authorization based on the subscriber information has been completed; and
including the entity in the personal network and providing a service received from the server to the entity,
wherein the entity is not registered in the PN gateway before the entity transmits the PN connection request message to the PN gateway.

2. The method of claim 1, wherein the subscriber information is encrypted information.

3. The method of claim 1, wherein the entity acquires the subscriber information from a subscriber information storage device and the acquired subscriber information is different from subscriber information stored in the PN gateway.

4. The method of claim 1, further comprising:
receiving a subscriber information request message from a specific entity; and
if the specific entity is an entity registered to a user of the PN gateway, encrypting the requested subscriber information and delivering the encrypted subscriber information to the specific entity.

5. A Personal Network (PN) gateway apparatus for providing a service of an external network to an entity constituting a personal network through the personal network, the apparatus comprising:
a near-field communication module;
a transceiver configured to perform communication with the external network; and
a PN controller configured to:
receive a PN connection request message from an entity connected through the near-field communication module,
determine whether the PN connection request message includes subscriber information, wherein the subscriber information is generated by another PN gateway connected with the entity,
control the transceiver to send, if the subscriber information is included in the PN connection request message, a registration request message including the subscriber information to a server, the server on the external network provides a service to the entity via the personal network, and
upon receiving from the server a response message indicating that entity authentication/authorization based on the subscriber information has been completed, include the entity in the personal network and provide a service received from the server to the entity,
wherein the entity is not registered in the PN gateway before the entity transmits the PN connection request message to the PN gateway.

6. The PN gateway apparatus of claim 5, wherein the subscriber information is encrypted information.

7. The PN gateway apparatus of claim 5, wherein the entity acquires the subscriber information from a subscriber information storage device and the acquired subscriber information is different from subscriber information stored in the PN gateway.

8. The PN gateway apparatus of claim 5, wherein if a specific entity that sent a subscriber information request message is an entity registered to a user of the PN gateway, the PN controller encrypts the requested subscriber information and delivers the encrypted subscriber information to the specific entity.

9. A method for providing by a Personal Network (PN) gateway a service of an external network to an entity constituting a personal network through the personal network, the method comprising:
receiving a PN connection request message from an entity;
determining whether the PN connection request message includes an address of a subscriber information storage device, wherein the subscriber information is generated by another PN gateway connected with the entity;
if the address of the subscriber information storage device is included in the PN connection request message, sending a message for requesting subscriber information for the entity to the subscriber information storage device;
receiving the subscriber information from the subscriber information storage device;
sending a registration request message including the subscriber information to a server, the server on the external network provides a service to the entity via the personal network;
receiving from the server a response message indicating that entity authentication/authorization based on the subscriber information has been completed; and
including the entity in the personal network and providing a service received from the server to the entity,
wherein the entity is not registered in the PN gateway before the entity transmits the PN connection request message to the PN gateway.

10. The method of claim 9, wherein the subscriber information is encrypted information.

11. The method of claim 10, further comprising:
receiving from a specific PN gateway a message for requesting subscriber information for a specific entity; and
if the specific entity is an entity registered to a user of the PN gateway, encrypting the requested subscriber information and delivering the encrypted subscriber information to the specific PN gateway.

12. A Personal Network (PN) gateway apparatus for providing a service of an external network to an entity constituting a personal network through the personal network, the apparatus comprising:
a near-field communication module;
a transceiver configured to perform communication with the external network; and
a PN controller configured to:
receive a PN connection request message from an entity,
determine whether the PN connection request message includes an address of a subscriber information storage device, wherein the subscriber information is generated by another PN gateway connected with the entity,
control the transceiver to send, if the address of the subscriber information storage device is included in the PN connection request message, a message for requesting subscriber information for the entity to the subscriber information storage device,
receive the subscriber information from the subscriber information storage device,
send a registration request message including the subscriber information to a server, the server on the external network providing a service to the entity via the personal network, and
upon receiving from the server a response message indicating that entity authentication/authorization based on the subscriber information has been completed, include the entity in the personal network, and provide a service received from the server to the entity, wherein the entity is not registered in the PN gateway before the entity transmits the PN connection request message to the PN gateway.

13. The PN gateway apparatus of claim 12, wherein the subscriber information is encrypted information.

14. The PN gateway apparatus of claim 12, wherein the PN controller receives a message for requesting subscriber information for a specific entity from a specific PN gateway, and if the specific entity is an entity registered to a user of the PN gateway, encrypts the requested subscriber information and delivers the encrypted subscriber information to the specific PN gateway.

15. A method for providing by a Personal Network (PN) gateway a service of an external network to an entity constituting a personal network through the personal network, the method comprising:
  receiving a PN connection request message from an entity;
  determining whether the PN connection request message includes an address of a subscriber information storage device, wherein the subscriber information is generated by another PN gateway connected with the entity;
  if the address of the subscriber information storage device is included in the PN connection request message, sending a registration request message including the address of the subscriber information storage device to a server, the server on the external network provides a service to the entity via the personal network;
  receiving from the server a response message indicating that entity authentication/authorization based on subscriber information acquired from the subscriber information storage device has been completed; and
  including the entity in the personal entity and delivering a service received from the server to the entity,
  wherein the entity is not registered in the PN gateway before the entity transmits the PN connection request message to the PN gateway.

16. The method of claim 15, further comprising:
  receiving a subscriber information request message for a specific entity from the server; and
  if the specific entity is an entity registered to a user of the PN gateway, transmitting subscriber information of the PN gateway to the server.

17. A Personal Network (PN) gateway apparatus for providing a service of an external network to an entity constituting a personal network through the personal network, the apparatus comprising:
  a near-field communication module;
  a transceiver configured to perform communication with the external network; and
  a PN controller configured to:
  receive a PN connection request message from an entity,
  determine whether the PN connection request message includes an address of a subscriber information storage device, wherein the subscriber information is generated by another PN gateway connected with the entity,
  control the transceiver to send, if the address of the subscriber information storage device is included in the PN connection request message, a registration request message including the address of the subscriber information storage device to a server, the server on the external network provides a service to the entity via the personal network, and
  upon receiving from the server a response message indicating that entity authentication/authorization based on subscriber information acquired from the subscriber information storage device has been completed, including the entity in the personal network, and provide a service received from the server to the entity,
  wherein the entity is not registered in the PN gateway before the entity transmits the PN connection request message to the PN gateway.

18. The PN gateway apparatus of claim 17, wherein the PN controller receives a subscriber information request message for a specific entity from the server, and if the specific entity is an entity registered to a user of the PN gateway, transmits subscriber information of the PN gateway to the server.

* * * * *